(12) United States Patent
Shekalim et al.

(10) Patent No.: US 10,827,367 B2
(45) Date of Patent: Nov. 3, 2020

(54) SYSTEM AND METHOD FOR AUTOMATIC IDENTIFICATION AND OPTIMIZATION OF OVERSHOOTING CELLS

(71) Applicant: RELIANCE JIO INFOCOMM LIMITED, Mumbai-Maharashtra (IN)

(72) Inventors: Parwiz Shekalim, Mumbai-Maharashtra (IN); Anshul Bhatt, Mumbai-Maharashtra (IN); Arun Karunakaran Nair, Mumbai-Maharashtra (IN); Vikas Kukreja, Haryana (IN); Tareq Amin, Mumbai-Mahrashtra (IN); Prithvi Raj Dhaka, Rajasthan (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days.

(21) Appl. No.: 16/339,198

(22) PCT Filed: Sep. 29, 2017

(86) PCT No.: PCT/IB2017/056002
§ 371 (c)(1),
(2) Date: Apr. 3, 2019

(87) PCT Pub. No.: WO2018/065865
PCT Pub. Date: Apr. 12, 2018

(65) Prior Publication Data
US 2019/0246292 A1    Aug. 8, 2019

(30) Foreign Application Priority Data
Oct. 5, 2016 (IN) .............................. 201621034079

(51) Int. Cl.
*H04W 24/02* (2009.01)
*H04W 24/10* (2009.01)
*H04W 16/00* (2009.01)

(52) U.S. Cl.
CPC ........... *H04W 24/02* (2013.01); *H04W 24/10* (2013.01); *H04W 16/00* (2013.01)

(58) Field of Classification Search
CPC ...... H04W 24/02; H04W 16/00; H04W 24/10
See application file for complete search history.

(56) References Cited

U.S. PATENT DOCUMENTS

| | | | |
|---|---|---|---|
| 2011/0176522 A1* | 7/2011 | Choi ................. | H04W 56/0045 370/336 |
| 2014/0071856 A1* | 3/2014 | Brisebois ............. | H04W 56/00 370/255 |

(Continued)

FOREIGN PATENT DOCUMENTS

| WO | 2012109029 A1 | 8/2012 |
|---|---|---|
| WO | 2016026531 A1 | 2/2016 |

OTHER PUBLICATIONS

International Search Report dated Jan. 18, 2018, distributed by Ranjan Biswas of the Indian Patent office.

*Primary Examiner* — Jaime M Holliday
(74) *Attorney, Agent, or Firm* — Hunton Andrews Kurth LLP

(57) ABSTRACT

Embodiments of the present invention relate to systems and methods for automatic identification and optimization of an overshooting cell (102) by receiving a parameter associated with at least one cell having a timing advance with a permissive range of operative user equipment (UE), wherein the parameter comprises a permissive void count threshold; identifying the timing advance as one of an active timing with at least one operative UE and a passive timing advance without at least one UE; determining at least one of a UE (Continued)

count of the operative UE in the active timing advance and a void count in the passive timing advance; identifying the at least one cell as the overshooting cell (102) by comparing at least one of: the UE count with the permissive range of operative UE and the void count with the permissive void count threshold; and modifying at least one transmission parameter of the overshooting cell (102).

9 Claims, 11 Drawing Sheets

(56) References Cited

U.S. PATENT DOCUMENTS

| | | | | |
|---|---|---|---|---|
| 2014/0162682 | A1* | 6/2014 | Tafreshi | H04W 24/02 455/456.1 |
| 2017/0257787 | A1* | 9/2017 | Regueira Caumel | H04W 24/02 |

* cited by examiner

SYSTEM AND METHOD FOR AUTOMATIC IDENTIFICATION AND OPTIMIZATION OF OVERSHOOTING CELLS

TECHNICAL FIELD

Embodiments of the present invention generally relate to a wireless network. In particular, embodiments of the present invention relate to a system and a method for automatic identification and optimization of overshooting cells in the wireless network.

BACKGROUND

In current scenario, telecom operators deploy multiple cell sites in different geographic locations to provide various voice and data communication services to users. Each cell site, deployed by the telecom operators in a particular location, serves the users in a defined coverage range covered by the cell site. Further, with the rapid increase in number of users over the past few years, the voice and data usage demand has also been increased resulting in additional deployment of cell sites handling high traffic. Moreover, with the large number of cell sites deployed across a country and each handling traffic in the coverage range, it becomes important for the telecom operators to monitor each cell site for optimum performance in terms of the voice as well as data traffic, the coverage range, a signal strength in the coverage range etc. However, at present, the telecom operators have to manually monitor the cell sites for measuring the performance of each cell site including multiple field visits for pre-optimization drive tests and post-optimization drive-tests. Also, the telecom operators have to manually analyze each cell site performance to propose suggestions for optimization of the cell site. Additionally, the proposed optimization suggestions rely on limited input data sources such as drive-tests that lacks the comprehensive correlation capability by using multiple key data sources like passive monitoring data, geo-location based measurement events data and operations support systems (referred hereinafter as OSS) data.

Along with the existing problems in the optimization of the cell sites, the other problem exists is optimization of an overshooting cell, wherein the overshooting cell is the cell whose transmitted radio frequency (RF) signal over propagates beyond the defined coverage range that results in serving a user equipment that was not intended to be served by that cell or causing excessive interference to a neighbouring or a far cell. The overshooting of the cell site is caused due to several reasons such as reflections from buildings, across open water, lakes, or high terrain areas etc. Moreover, the overshooting cell problem is a result of improper design in network planning. Also, the user equipment present in an area of the overshooting cell may suffer frequent call drops or low throughput due to high level of interference, or frequent hand-overs, etc.

Additionally, unbalanced cell coverage areas due to the overshooting cell problem are associated with low quality user experience and increased operational costs. The overshooting cell that is grossly larger than other cells in the wireless network provides a significantly lower signal-to-noise ratio (SNR) than the other cells in the wireless network and provides communication links of lower quality. Similarly, higher transmit power levels and frequent resending of lost packets for communications with such cell are required and therefore, the user equipment experiences decreased battery life, and overall capacity and performance of the network decreased. The design parameters of the user equipment are built for even sized cells and if the user equipment have to establish communications to the over shooter cell, then this results in higher call drops. Therefore, with the prior knowledge of the over shooter cells, the correction of undesirable coverage range helps in layout planning and automation for correction of such errors.

The possible actions to improve such situations include changing the coverage range of the overshooting cell and mobility blacklisting of certain cells. Further, there has been some level of automation for changing the coverage area such as by correcting overshooting base station of the cell and by determining neighbour rankings for a cell, etc. In existing approaches for such problems, the user equipment establishes a communication with a a cell site with highest RSRP or RSRQ values that is usually physically nearby to the user equipment. The quality of the communication depends upon a distance between the nearest cell site to the user equipment and is inversely proportional to the distance with the signal strength. Typically, closer the nearest cell site is to the user equipment, the higher quality the communications link is. This is due to the communication signals between the nearest cell site and the user equipment have a shorter distance to traverse. As such, the cell sites are sometimes scattered across the wireless network in a manner that provides optimum area of coverage of each cell site in the wireless network. In a situation, where the cell sites of the wireless network are closer in area of coverage, the distances between the edge of the cell site and the corresponding base station is similar to the distance between the edge of the nearest cell site and that corresponding base station. As such, when the user equipment transitions from a first cell site to a second cell site of similar area, the conditions for communication with each base station is similar enough that the quality of the communication links is also be similar and the user experience is more seamless during the transition between cells.

Other existing approaches for detection of the overshooting cell provides ranking neighbour relationships between multiple user equipments in the wireless network, based on handover statistics directly received from the wireless network. There are also some other self-optimization network applications present that rely purely on neighbour relation ranking to detect the overshooting cell. One such known procedure is self-optimization network applications procedures that are intended to improve the radio environment through dynamic adjustments of per-cell settings such as pilot power, elevation beam steering (tilting), azimuth direction (planning), as well as the beam width of the antenna (fanning). However, such existing approaches need to have prior knowledge of the overshooting cell and make decisions as to whether or not the overshooting cell needs to be taken into consideration during execution of the application. Also, the existing approaches does not provide automatic approach for detecting and correcting the overshooting cell. Further, the existing approach does not make proactive changes in any transmission and/or reception parameters to correct the overshooting cell.

Therefore, in view of the above shortcomings in the existing approaches, there is a need for automatic detection of the overshooting cell and optimization of such overshooting cell by proactively making changes in the transmission and/or the reception parameters of the overshooting cell.

SUMMARY

This section is provided to introduce certain aspects of the present invention in a simplified form that are further described below in the detailed description. This summary is not intended to identify the key features or the scope of the claimed subject matter.

Embodiments of the present invention may relate to a method for automatic identification and optimization of at least one overshooting cell, the method comprising: receiving at least one parameter associated with at least one cell, wherein the at least one parameter comprises a permissive void count threshold and at least one transmission parameter corresponding to a coverage area of the at least one cell, the at least one cell comprises at least one timing advance, and the at least one timing advance has a permissive range of operative user equipment; identifying the at least one timing advance as one of an active timing advance and a passive timing advance, wherein the active timing advance corresponds to the at least one timing advance with at least one operative user equipment, and the passive timing advance corresponds to the at least one timing advance without at least one operative user equipment; determining at least one of a UE count of the operative user equipment in the active timing advance and a void count of the passive timing advance in the at least one cell; identifying the at least one cell as the at least one overshooting cell, wherein the at least one overshooting cell is identified based on a comparison of at least one of: the UE count of the operative user equipment in the active timing advance with the permissive range of operative user equipment, and the void count of the passive timing advance with the permissive void count threshold; and modifying the at least one transmission parameter to change the coverage area of the at least one overshooting cell.

Embodiments of the present invention may relate to a system for automatic identification and correction/remediation of at least one overshooting cell, the system comprising: an input unit configured to: receive at least one parameter associated with at least one cell, wherein the at least one parameter comprises a permissive void count threshold and at least one transmission parameter corresponding to a coverage area of the at least one cell, the at least one cell comprises at least one timing advance, and the at least one timing advance has a permissive range of operative user equipment; and an optimizer unit configured to: identify the at least one timing advance as one of an active timing advance and a passive timing advance, wherein the active timing advance corresponds to the at least one timing advance with at least one operative user equipment, and the passive timing advance corresponds to the at least one timing advance without at least one operative user equipment, determine at least one of a UE count of the operative user equipment in the active timing advance and a void count of the passive timing advance in the at least one cell, identify the at least one cell as the at least one overshooting cell, wherein the at least one overshooting cell is identified based on comparison of at least one of: the UE count of the operative user equipment in the active timing advance with the permissive range of operative user equipment, and the void count of the passive timing advance with the permissive void count threshold; and modify the at least one transmission parameter to change the coverage area of the at least one overshooting cell.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that disclosure of such drawings includes disclosure of electrical components or circuitry commonly used to implement such components.

DETAILED DESCRIPTION

Figure 1A:
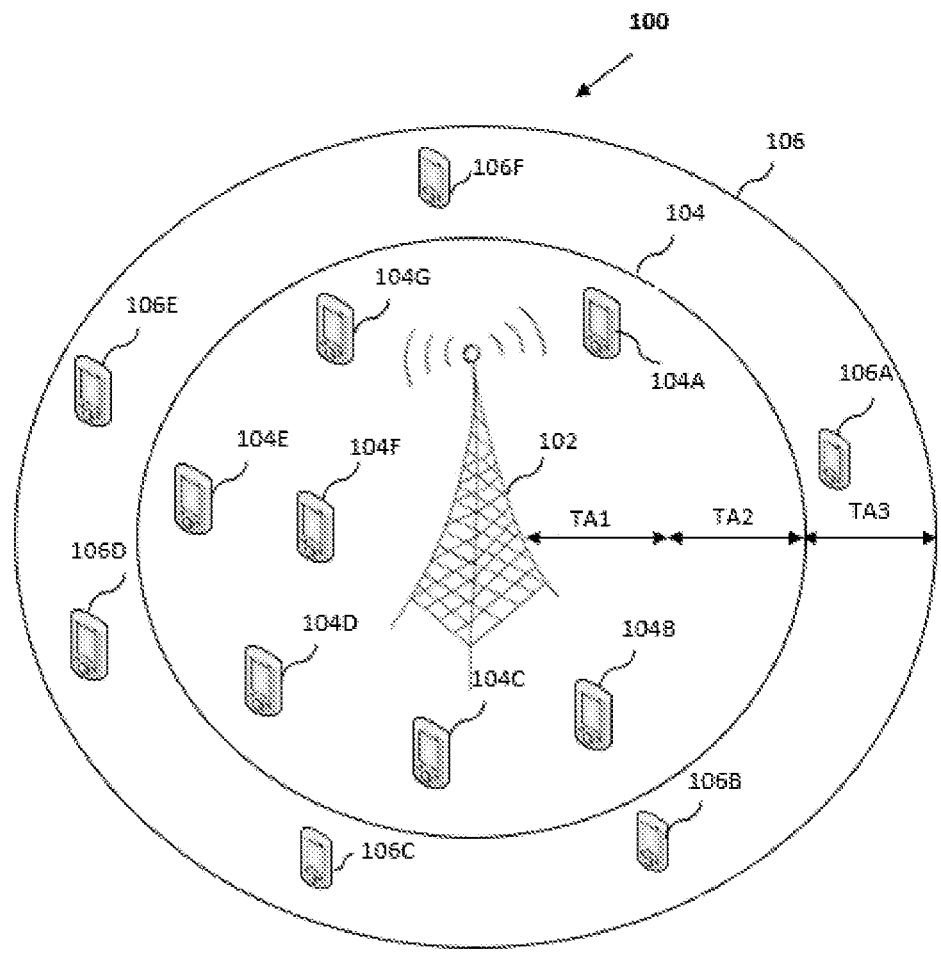
FIG. 1A illustrates an exemplary scenario [100A] representing at least one cell, in accordance with an embodiment of the present disclosure.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention encompasses a system and a method for automatic identification and optimization of at least one overshooting cell, wherein the at least one overshooting cell serves at least one user equipment in at least one of a pre-defined coverage range and an overshooting range.

The present invention further encompasses systems and methods for automatically identifying the at least one overshooting cell using one of a morphology overshooting identification, an island overshooting identification, an automatic cell range based overshooting identification and a geo-located measurement events based overshooting identification. The details of the identification of the at least one overshooting cell is explained in details hereinafter.

The present invention further encompasses systems and methods for automatic optimization of the at least one overshooting cell by modifying at one transmission parameters of the at least one overshooting cell to change the overshooting range of the at least one overshooting cell.

As used herein, the at least one overshooting cell is a cell that over propagates radio signals and/or serves the at least one user equipment in the overshooting range i.e. beyond the pre-defined coverage range.

As used herein, the at least one user equipment is a computing device that is latched to the at least one overshooting cell and thus, receives voice and data services from the at least one overshooting cell. The user equipment may have a processor, a display, a memory and an input means such as hard keypad and/or a soft keypad. The user equipment may include, but not limited to, a mobile phone, a tablet, a wearable device, a phablet, a personal digital assistance and any such device obvious to a person skilled in the art.

As used herein, the pre-defined coverage range is a permissible distance upto which the at least one overshooting cell is designed to transmit the radio signals. The pre-defined coverage range of the at least one overshooting cell may be defined by network planners during at least one of a pre-deployment phase and a post-deployment phase of the at least one overshooting cell. Further, the at least one user equipment is served by the at least one overshooting cell in the pre-defined coverage range.

As used herein, the overshooting range is an extended distance beyond the pre-defined coverage range in which the radio signals of the at least one overshooting cell over propagates and thus, serves the at least one user equipment in the overshooting range.

As illustrated in FIG. 1A, the present invention illustrates an exemplary scenario [100A] representing at least one cell, in accordance with an embodiment of the present disclosure, depicting: at least one cell [102], a pre-defined coverage range [104], a first set of user equipments [104A-104G] present in the pre-defined coverage range [104], an overshooting range [106], and a second set of user equipments [106A-106F] present in the overshooting range [106].

The at least one cell [102] may transmit, through a transmitter, radio signals in the air that may propagate to a distance covered by the pre-defined coverage range [104]. Further, the first set of user equipments [104A-104G] present in the pre-defined coverage range [104] may receive the radio signals transmitted by the at least one cell [102] and avail voice and data services. The radio signals transmitted by the at least one cell [102] may also propagate to an extended distance covered by overshooting range [106]. Moreover, the second set of user equipments [106A-106F] present in the overshooting range [106] may receive the radio signals transmitted by the at least one cell [102] and avail voice and data services. The pre-defined coverage range [104] may be defined by network planners during at least one of a pre-deployment phase and a post-deployment phase. On contrary, the overshooting range [106] may be a result of various obstacles present in the pre-defined coverage range [104], a remote area with less density of user equipments, and a wrong estimation of the pre-defined coverage range [104] by the network planners during the pre-deployment phase. In an embodiment, the at least one cell [102] may only have the pre-defined coverage range [104] and not the overshooting range [106]. In other embodiment, the at least one cell [102] may have both the pre-defined coverage range [104] and the overshooting range [106].

As depicted in the exemplary scenario of the FIG. 1A, the pre-defined coverage range [104] of the at least one cell [102] has two timing advances, namely [TA1] and [TA2] while the overshooting range [106] has one timing advance [TA3]. Each timing advance [TA] corresponds to a distance, from the at least one cell [102], covering an area in one of the pre-defined coverage range [104] and the overshooting range [106]. For an instance and as seen from the exemplary FIG. 1, the timing advance [TA1] covers a distance of (x) meters from the at least one cell [102] in the pre-defined coverage range [104], the timing advance [TA2] covers a distance of (y+x) meters from the at least one cell [102] in the pre-defined coverage range [104], and the timing advance [TA3] covers a distance of (z+y+x) meters from the at least one cell [102] in the overshooting range [106]. Further, each of the timing advances [TA1], [TA2] and [TA3] may occur in a sequence in at least one of the pre-defined coverage range [104] and the overshooting range [106]. The timing advances data may be available from base station or an eNodeB, trace ports, or from probes, drive tests or any other data sources. In an embodiment, the pre-defined coverage range [104] may be calculated based on the at least one timing advance which is as follows:

One TA=16*Ts (Ts may be a basic timing unit as defined in the 3GPP Standard, TS 36.112), wherein Ts=32.55 μs Speed of light, C=3×108 m/s or 0.3 Km/μs Therefore, the distance travelled in one TA interval= (16*32.55*(0.3)=156.24 m or 0.156 Km.

Thereby, one-way distance between the at least one cell [102] and a user equipment=156.24/2=78.12 m or 0.078 Km Further, as seen in the FIG. 1A, at a time, one or more user equipments may be operative in each of the timing advance [TA1, TA2, TA3] of the at least one cell [102].

The first set of user equipment [104A-104G] may be operative in the timing advances [TA1, TA2] of the pre-defined coverage range [104] and the second set of user equipment [106A-106F] may be operative in the timing advance [TA3] of the overshooting range [106] resulting in a total count of 7 operative user equipment [104A-104G] in the timing advances [TA1, TA2] and a total count of 6 operative user equipment [106A-106F] in the timing advances [TA3]. Such timing advance where one or more user equipment is operative is called as an active timing advance. Alternatively, at any instance, no/zero user equipment may be operative and/or present in any of the timing advance [TA1, TA2, TA3]. Such timing advance where zero/no/relatively very less number of user equipment is operative is called as a passive timing advance and thereby may be counted as a void passive timing advance.

Moreover, each of the timing advance [TA1, TA2, TA3] of the at least one cell [102] corresponds to one of a permissive range of the operative user equipment and a permissive void count threshold. The permissive range of the operative user equipment corresponds to a predefined count of the user equipments allowed to operate in the at least one timing advance [TA1, TA2, TA3]. The permissive void count threshold corresponds to a predefined count of the passive timing advance acceptable to occur in a sequence. In addition, the predefined count of the user equipments and the predefined count of the passive timing advance may be defined by the network planners during one of the pre-deployment phase and post-deployment phase of the at least one cell [102] and may depend on the various factors such as capacity of handling traffic, the coverage range [104, 106] and transmission power of the at least one cell [102].

Figure 1B:
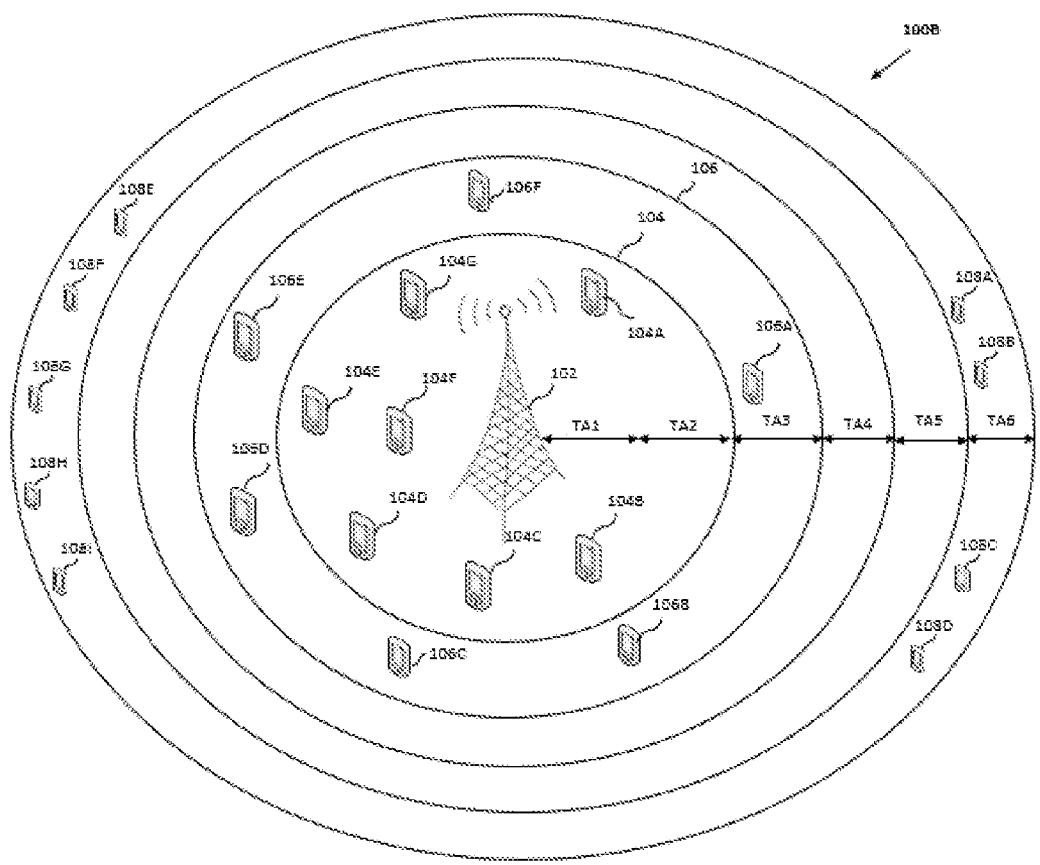
FIG. 1B illustrates another exemplary scenario [100B] representing at least one cell, in accordance with an embodiment of the present disclosure.

As illustrated in FIG. 1B, the present invention illustrates another exemplary scenario [100B] representing the at least one cell [102] with the first set of user equipments [104A-104G] operative in the pre-defined coverage range [104], the second set of user equipments [106A-106F] operative in the overshooting range [106], and a third set of user equipments [108A-108I] operative in the overshooting range [106], Moreover, as seen in the another exemplary scenario of the FIG. 1B, the pre-defined coverage range [104] of the at least one cell [102] has two timing advances, namely [TA1] and [TA2] with the first set of operative user equipments while the overshooting range [106] has four timing advances [TA3-TA6], wherein [TA3] and [TA6] may have the second set of operative user equipments [106A-106F] and the third set of operative user equipments [108A-108I], whereas [TA4] and [TA5] may have not have any operative user equipments therein i.e. no/zero operative user equipments. Thereby, [TA1], [TA2], [TA3] and [TA6] may refer as the active timing advances due to the presence of the operative user equipments and [TA4] and [TA5] may refer as the passive timing advances due to the non-presence of the operative user equipment. Moreover, the another exemplary scenario [100B] may have some passive timing advances [TA4-TA5] occurring in between some active timing advances [TA1-TA3, TA6].

Figure 2:
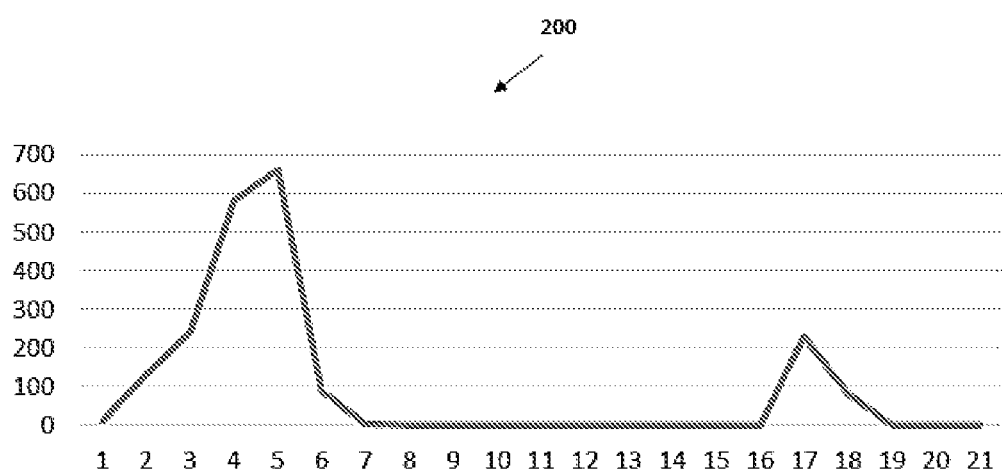
FIG. 2 illustrates an exemplary graph [200] of a timing advance for the at least one cell, in accordance with an embodiment of the present disclosure.

As illustrated in FIG. 2, the present invention illustrates an exemplary graph [200] of timing advances for the at least one cell [102], in accordance with an embodiment of the present disclosure. The exemplary graph [200] represents the timing advances [TA1-TA21] on x-axis and the count of operative user equipment on y-axis. As seen in the exemplary graph [200] of FIG. 2, TA1 has a count of 1 operative user equipment, TA2 has a count of 100 operative user equipment, TA3 has a count of 200 operative user equipment, TA4 has a count of 400 operative user equipment, TA5 has a count of 600 operative user equipment, and TA6 has a count of 100 operative user equipment, approximately. However, from TA7 to TA16, a count of zero operative user equipment has been reported. Thereby, TA1 to TA6 have been identified as active timing advances as the user equipments are operative in such timing advances and TA7 to TA16 have been identified as passive timing advances as no user equipment is operative in these timing advances and thus counted as a 10 continuous voids of passive timing advances. Based on such measurements of operative user equipment in each timing advance and other parameters of the at least one cell [102], the at least one cell [102] may be automatically identified as an overshooting cell. The specifics of how the at least one cell [102] may be automatically identified as an overshooting cell is explained hereinafter.

Figure 3:
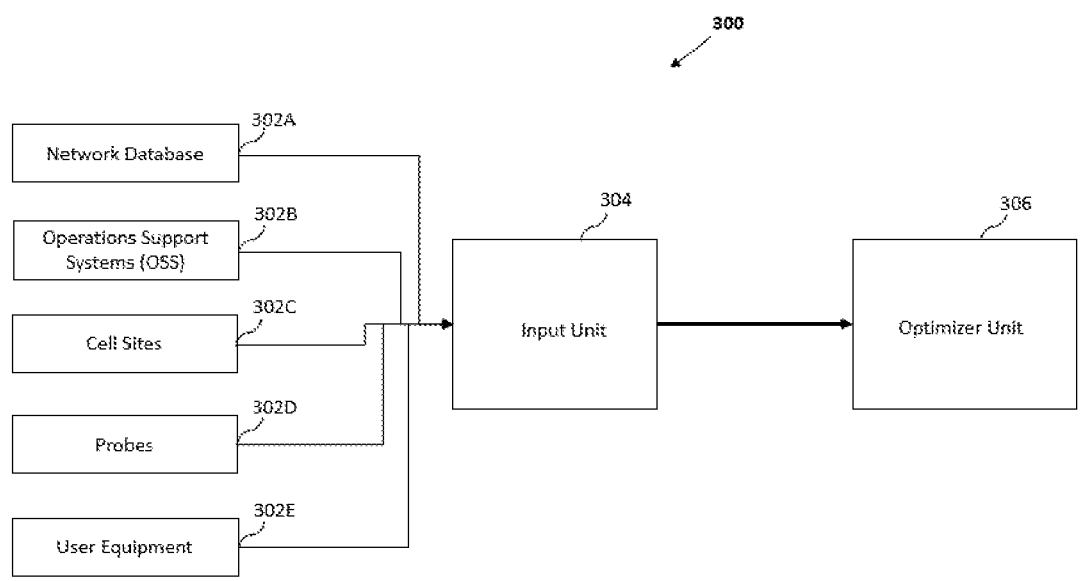
FIG. 3 illustrates a system [300] for automatic identification and optimization of at least one overshooting cell, in accordance with an embodiment of the present disclosure.

As illustrated in FIG. 3, the present invention illustrates an exemplary system [300] for automatic identification and optimization of at least one overshooting cell, in accordance with an embodiment of the present disclosure, the system [300] comprises: an input unit [304] and an optimizer unit [306].

The input unit [304] may be configured to receive at least one of a network database parameter [302A], an OSS parameter [302B], a cell site parameter [302C], a probes parameter [302D] and a user equipment parameter [302E]. The network database parameter [302A] includes at least one heat map of the coverage area information corresponding to the at least one cell [102], wherein the at least one heat map corresponds to a measured radio frequency (RF) strength and/or a quality value. The cell site parameter [302C] includes information corresponding to trace ports, wherein the trace ports information corresponds to logs and performance measurement received from the at least one cell [102]/enodeB. Further, at least one of cell parameter logs/KPI [302C] and the probes parameter [302D] includes at least one of logs and KPI, wherein the probes parameter corresponds to information related to reference signals received power (referred hereinafter as RSRP), reference signal received quality (referred hereinafter as RSRQ), signal-to-interference-plus-noise ratio (referred hereinafter as SINR), channel quality indicator (referred hereinafter as COI), hand-over, hand-over ratio, hand-over success rate, a RRC re-establishment, and a cell throughput. Also, the user equipment parameter [302E] includes information corresponding to reporting of operative user equipments along with geo-positioning information of the operative user equipments. The input unit may further be configured to receive at least one of the permissive range of the operative user equipment, the permissive void count threshold, a total number of timing advances, a neighbour ranking data, a handover data, an interference information, a morphology type, a site database with a latitude/longitude and an azimuth, a call trace record, an extensive drive test log file, a signal received quality, a channel quality indication, the pre-defined coverage range [102], the overshooting range [106], and at least one transmission parameter associated with the at least one cell [102]. The transmission parameter may include at least one of a transmission power value, a reference signal power value and a tilt angle value associated with the at least one cell [102]. Moreover, such parameters may be received, from at least one of the at least one cell [102], the enodeB, a NodeB, by the input unit [304] through one of an automatic update and a manual update in the system [300].

Once the input unit [304] receives such parameters, the input unit [304] may further transmit these parameters to the optimizer unit [306] for automatic identification of the at least one overshooting cell, wherein the at least one overshooting cell is identified by determining whether the at least one cell [102] is an overshooting cell or not. The optimizer unit [306] may configured to first identify the at least one timing advance as one of the active timing advance and the passive timing advance, wherein the active timing advance corresponds to the timing advance where one or more user equipment is operative and the passive timing advance corresponds to the timing advance where no user equipment is operative. For an instance, from the exemplary graph of the FIG. 2, TA1 to TA6 may be identified as the active timing advance and TA7 to TA16 may be identified as the passive timing advance.

After identifying the at least one timing advance as one of the active timing advance and the passive timing advance, the optimizer unit [306] may further configured to determine a total count of the operative user equipment in the active timing advance and a total count of voids (i.e. non-operative user equipment) in the passive timing advance. Following the same instance from the exemplary graph of the FIG. 2, TA1 has a count of 1 operative user equipment, TA2 has a count of 100 operative user equipment, TA3 has a count of 200 operative user equipment, TA4 has a count of 400 operative user equipment, TA5 has a count of 600 operative user equipment, and TA6 has a count of 100 operative user equipment, approximately. And from TA7 to TA16, a count of zero operative user equipment may have been reported i.e. a total of 10 continuous void counts.

After the optimizer unit [306] counts the operative user equipment in each of the timing advances, the optimizer unit [306] may compare at least one of the total count of the operative user equipment in the active timing advance with the permissive range of the operative user equipment and the total count of voids (i.e. non-operative user equipment) in the passive timing advance with the permissive void count threshold. Following the same example from the exemplary graph of the FIG. 2, TA1 to TA4 may present in the pre-defined coverage range [104] of the at least one cell [102] and TA5 to TA21 may lie in the overshooting range [106] of the at least one cell [102]. The optimizer unit may compare the total count of the operative user equipment of the timing advances [TA5-TA6] (i.e. total of 700 operative user equipment as 600 from TA5 and 100 operative user equipment from TA6) in the overshooting range [106] with the permissive range of the operative user equipment (in an instance, may be considered as 400). Similarly, optimizer unit may compare the total void counts (i.e. 10) in the overshooting range [106] with the permissive void count threshold (in an instance, may be considered as 5). After the optimizer unit [306] compares at least one of the total count of the operative user equipment with the permissive range of the operative user equipment and the total count of voids with the permissive void count threshold, the optimizer unit [306] may further identify the at least one cell [102] as the at least one overshooting cell in an event at least one of the total count of the operative user equipment exceeds/below the permissive range of the operative user equipment and the total count of voids exceeds/below the permissive void count threshold. In the example considered, the at least one cell [102] may be identified as the at least one overshooting cell as the total count of the 700 operative user equipment exceeds the permissive range of the 400 operative user equipment. Similarly, the total 10 voids count exceeds the permissive void count threshold of 5 and thereby considers the at least one cell [102] as the overshooting cell.

Once the optimizer unit [306] identify the at least one cell [102] as the at least one overshooting cell [102], the optimizer unit [306] may determine if the at least one overshooting cell [102] is a wanted/good overshooting cell or an unwanted/bad overshooting cell by comparing the at least one overshooting cell [102] with a list of wanted/good overshooting cells stored in a database. In an event, the at least one overshooting cell [102] determines as the wanted/good overshooting cell, the optimizer unit [306] may notify the network planners and may not modify the at least one transmission parameter of the at least one overshooting cell [106]. Moreover, the wanted/good overshooting cell may be deployed intentionally by the network planners to cover various holes in a coverage area of other neighbour cells for providing the services to users. Also, the coverage hole may be considered when a particular area may have a limited number of user equipment.

In an event, the at least one overshooting cell [102] corresponds to the unwanted/bad overshooting cell, the optimizer unit [306] may modify the at least one transmission parameter to change the coverage area [104, 106] of the at least one overshooting cell [106]. The transmission parameter includes at least one of the transmission power value, the reference signal power value and the electrical tilt angle value corresponding to the coverage range [104, 106] of the at least one overshooting cell [102]. The optimizer unit [306] may calculate the modification in the electrical tilt angle value of the at least one cell [102] by using the formula below:

$$\text{Delta in } E \text{ Tilt} = -(\text{ATAN}((H1-H2)/OD) - \text{ATAN}((H1-H2)/CR)), \text{ wherein}$$

H1 may be the height of a transmitter of the at least one overshooting cell [102], H2 may be the height of a receiver of the at least one overshooting cell [102], OD may the overshooting range [106], and CR may a proposed coverage change. Further, the reduction in reference signal transmit power may be used as another way of optimization to control the coverage range [104, 106] of at least one overshooting cell [102] especially in cases of coverage overlap scenarios in dense/urban environments.

Figure 4:
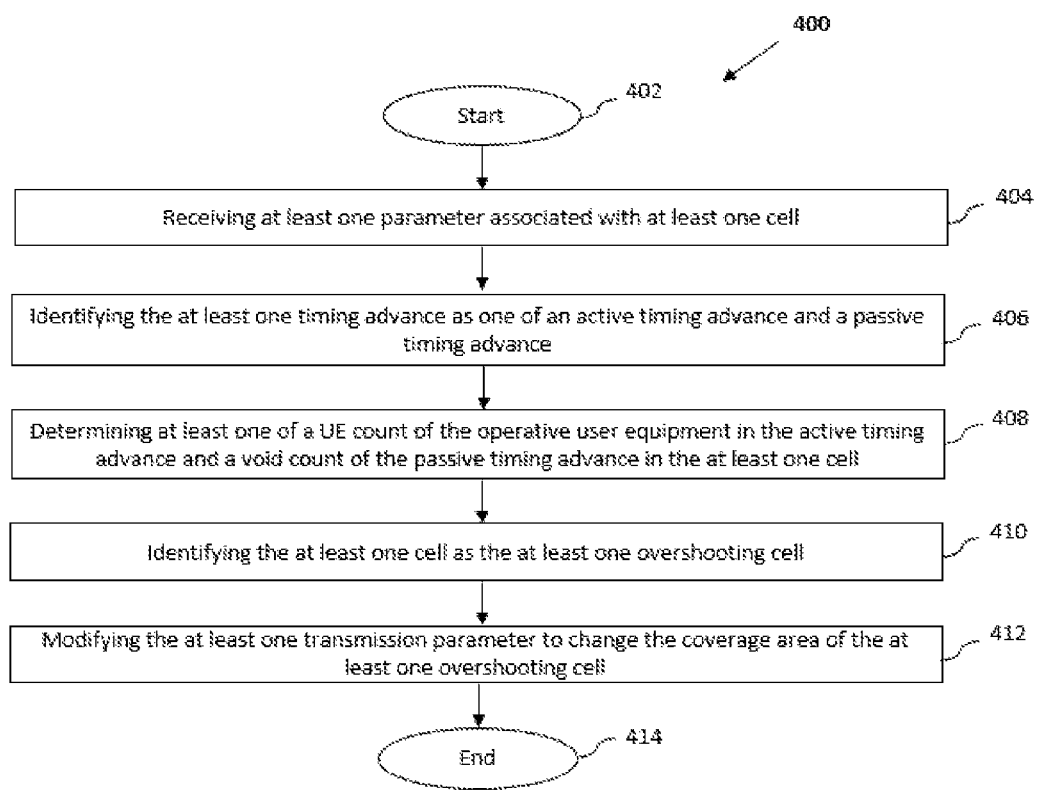
FIG. 4 illustrates an exemplary method flow diagram [400] for automatic identification and optimization of the at least one overshooting cell, in accordance with an embodiment of the present invention.

As illustrated in FIG. 4, the present invention illustrates an exemplary method flow diagram [400] for automatic identification and optimization of the at least one overshooting cell [102], in accordance with an embodiment of the present invention. The method flow initiates at step 402.

At step 404, the method flow diagram [400] may receive at least one of the network database parameter [302A] including at least one of the at least one heat map of the coverage area information corresponding to the at least one cell [102], at least one of the cell parameter logs/KPI, the cell site parameter [302C] including information corresponding to the trace ports, the probes parameter [302D] including at least one of the logs and KPI and the user equipment parameter [302E] including information corresponding to reporting of the operative user equipments along with the geo-positioning information. The input unit may further be configured to receive at least one of the permissive range of the operative user equipment, the permissive void count threshold, the total number of timing advances, the neighbour ranking data, the handover data, the interference information, the morphology type, the site database with the latitude/longitude and an azimuth, the call trace record, the extensive drive test log file, the signal received quality, the channel quality indication, the pre-defined coverage range [102], the overshooting range [106], and the at least one transmission parameter associated with the at least one cell [102].

At step 406, the method flow diagram [400] may receive the at least one parameter from the at least one cell [102]/the enodeB and based on the at least one received parameter, the method flow diagram [400] identify the at least one timing advance as one of the active timing advance and the passive timing advance, wherein the active timing advance corresponds to the timing advance where one or more user equipment is operative and the passive timing advance corresponds to the timing advance where no user equipment is operative. For an instance, from the exemplary graph of the FIG. 2, TA1 to TA6 may be identified as the active timing advance and TA7 to TA16 may be identified as the passive timing advance.

At step 408, the method flow diagram [400] may determine the total count of the operative user equipment in the active timing advance and the total count of voids (i.e. non-operative user equipment) in the passive timing advance. Following the same instance from the exemplary graph of the FIG. 2, TA1 has a count of 1 operative user equipment, TA2 has a count of 100 operative user equipment, TA3 has a count of 200 operative user equipment, TA4 has a count of 400 operative user equipment, TA5 has a count of 600 operative user equipment, and TA6 has a count of 100 operative user equipment, approximately. And from TA7 to TA16, a count of zero operative user equipment may have been reported i.e. a total of 10 void counts.

At step 410, the method flow diagram [400] may compare at least one of the total count of the operative user equipment in the active timing advance with the permissive range of the operative user equipment and the total count of voids (i.e. non-operative user equipment) in the passive timing advance with the permissive void count threshold. Following the same example from the exemplary graph of the FIG. 2, TA1 to TA4 may present in the pre-defined coverage range [104] of the at least one cell [102] and TA5 to TA21 may lie in the overshooting range [106] of the at least one cell [102]. The optimizer unit may compare the total count of the operative user equipment of the timing advances [TA5-TA6] (i.e. total of 700 operative user equipment as 600 from TA5 and 100 operative user equipment from TA6) in the overshooting range [106] with the permissive range of the operative user equipment (in an instance, may be considered as 400). Similarly, optimizer unit may compare the total voids counts (i.e. 10) in the overshooting range [106] with the permissive void count threshold (in an instance, may be considered as 5).

After the method flow diagram [400] compares at least one of the total count of the operative user equipment with the permissive range of the operative user equipment and the total count of voids with the permissive void count threshold, the method flow diagram [400] may further identify the at least one cell [102] as the at least one overshooting cell in an event at least one of the total count of the operative user equipment exceeds/below the permissive range of the operative user equipment and the total count of voids exceeds/below the permissive void count threshold. In the example considered, the at least one cell [102] may be identified as the at least one overshooting cell as the total count of the 700 operative user equipment exceeds the permissive range of the 400 operative user equipment. Similarly, the total 10 voids count exceeds the permissive void count threshold of 5 and thereby considers the at least one cell [102] as the overshooting cell.

At step 412, the method flow diagram [400] may modify the at least one transmission parameter to change the coverage area of the at least one overshooting cell [102]. The transmission parameter includes at least one of the transmission power value, the reference signal power value and the electrical tilt angle value corresponding to the coverage range [104, 106] of the at least one overshooting cell [102]. The optimizer unit [306] may calculate the modification in the electrical tilt angle value of the at least one cell [102] by using the formula below:

$$\text{Delta in } E \text{ Tilt} = -(\text{ATAN}((H1-H2)/OD) - \text{ATAN}((H1-H2)/CR)), \text{ wherein}$$

H1 may be the height of a transmitter of the at least one overshooting cell [102], H2 may be the height of a receiver of the at least one overshooting cell [102], OD may be the overshooting range [106], and CR may a proposed coverage change. Further, the reduction in reference signal transmit power may be used as another way of optimization to control the coverage of at least one overshooting cell [102] especially in cases of coverage overlap scenarios in dense urban/urban environments. Then, the method [400] may end at step 414.

The present invention further facilitates the optimizer unit [306] for automatically identifying the at least one overshooting cell [102] using one of a morphology overshooting identification, an island overshooting identification, an automatic cell range based overshooting identification and a geo-located measurement events based overshooting identification. The details for each of the identification systems and methods is provided hereinafter.

Figure 5:
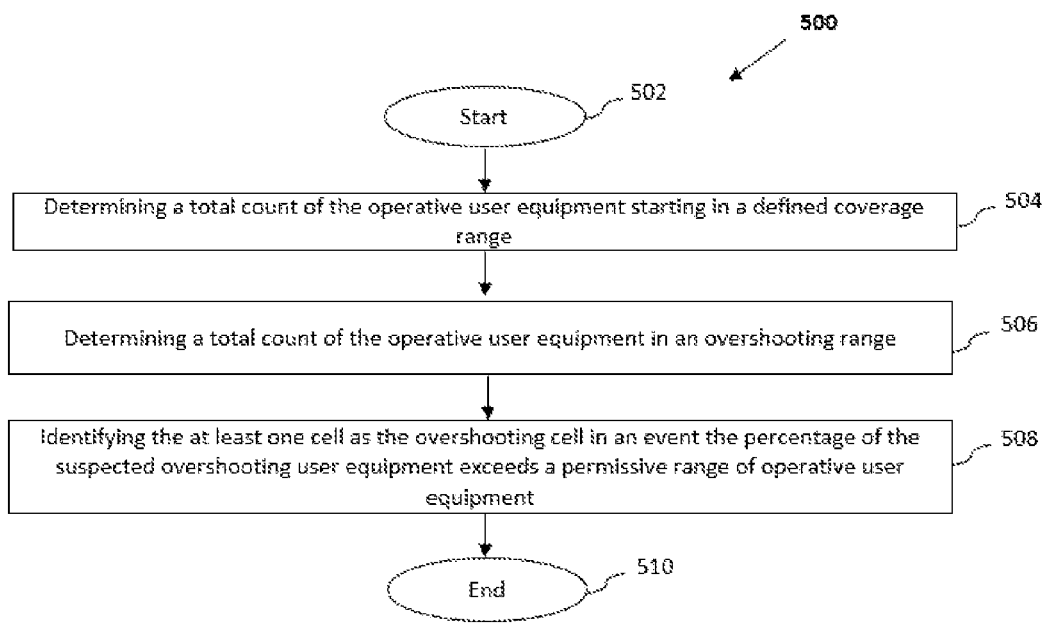
FIG. 5 illustrates an exemplary method flow diagram [500] for automatic identification and optimization of the at least one overshooting cell, in accordance with an embodiment of the present invention relating to a morphology based overshooting identification.

As illustrated in FIG. 5, the present invention illustrates an exemplary method flow diagram [500] for automatic identification and optimization of the at least one overshooting cell [102], in accordance with an embodiment of the present invention relating to a morphology based overshooting identification.

The morphology overshooting identification may be based on identifying the at least one overshooting cell [102] that overshoots the pre-defined coverage range [104] based on the covered morphology. For example, any cell located in a dense urban area is not expected to cover more than 300 m of cell range/distance. The morphology overshooting identification may further based on the OSS counters for each of the timing advance For the morphology overshooting identification, the input unit [304] may be configured to receive parameters for the timing advance distribution of the at least one cell [102], the morphology type of the at least one cell [102], the pre-defined coverage range [104] of the at least one cell [102] based on morphology type, and the permissive range of operative user equipment. The input unit [304] transmits the parameters to the optimizer unit [306] and the method flow diagram [500] initiates at step 502.

At step 504, the method flow diagram [500] may determine the total count of the operative user equipment starting from first timing advance (i.e. at 78 meters from the at least one cell [102]) till last timing advance in the defined coverage range [104] where the operative user equipment appears.

At step 506, the method flow diagram [500] may determine, from the last timing advance, the total count of the operative user equipment in the overshooting range [106] based on the morphology of the area covered by the at least one cell [102]. Such operative user equipment in the overshooting range [106] may be termed as suspected overshooting user equipment.

At step 508, the method flow diagram [500] may identify the at least one cell [102] as the overshooting cell [102] in an event the percentage of the suspected overshooting user equipment, out of the total operative user equipment, exceeds the permissive range of operative user equipment. The method flow diagram [500] may end at step [510].

Figure 6:
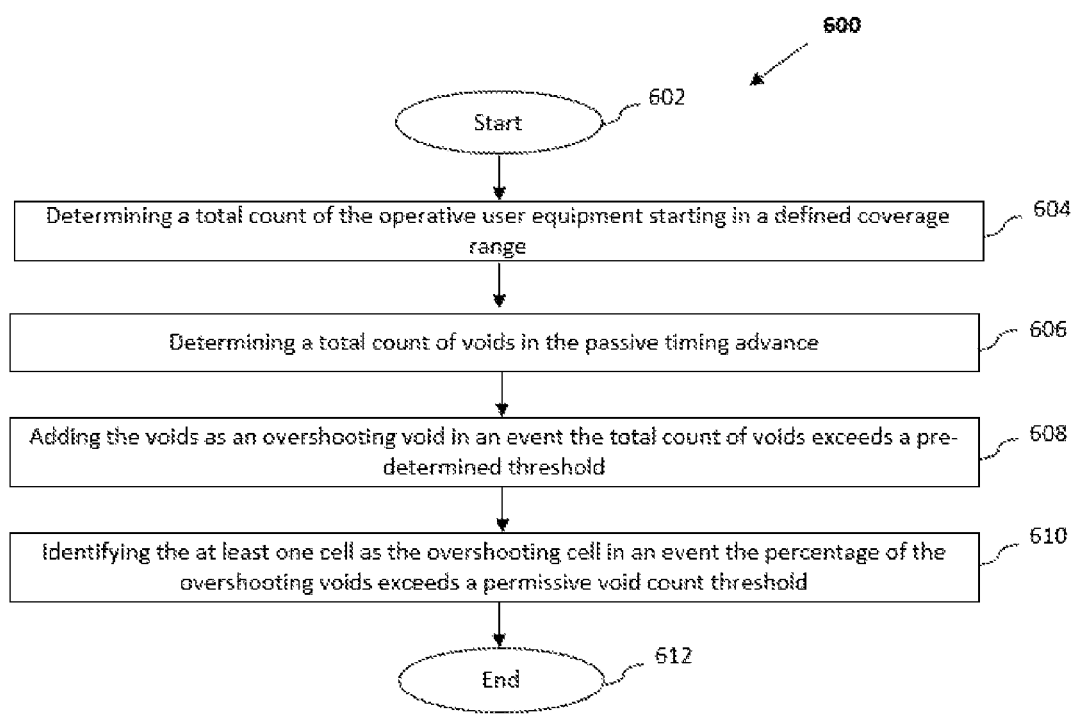
FIG. 6 illustrates an exemplary method flow diagram [600] for automatic identification and optimization of the at least one overshooting cell, in accordance with an embodiment of the present invention relating to an island based overshooting identification.

As illustrated in FIG. 6, the present invention illustrates an exemplary method flow diagram [600] for automatic identification and optimization of the at least one overshooting cell [102], in accordance with an embodiment of the present invention relating to relating to an island based overshooting identification.

For the island overshooting identification, the input unit [304] may be configured to receive parameters for the timing advance distribution of the at least one cell [102], the morphology type of the at least one cell [102], the permissive void count threshold, the permissive range of operative user equipment, and the non-operative user equipment in the passive timing advance. The input unit [304] transmits the parameters to the optimizer unit [306] and the method flow diagram [600] initiates at step 602.

At step 604, the method flow diagram [600] may determine the total count of the operative user equipment starting from first timing advance (i.e. at 78 meters from the at least one cell [102]) till last timing advance in the defined coverage range [104] where the operative user equipment appears.

At step 606, the method flow diagram [600] may determine the total count of voids after screening a first void in the passive timing advance.

At step 608, the method flow diagram [600] may add the voids as an overshooting void in an event the total count of voids exceeds a pre-determined threshold.

At step 610, the method flow diagram [600] may identify the at least one cell [102] as the overshooting cell [102] in an event the percentage of the overshooting voids exceeds the permissive void count threshold. The method flow diagram [600] may end at step [612].

Figure 7:
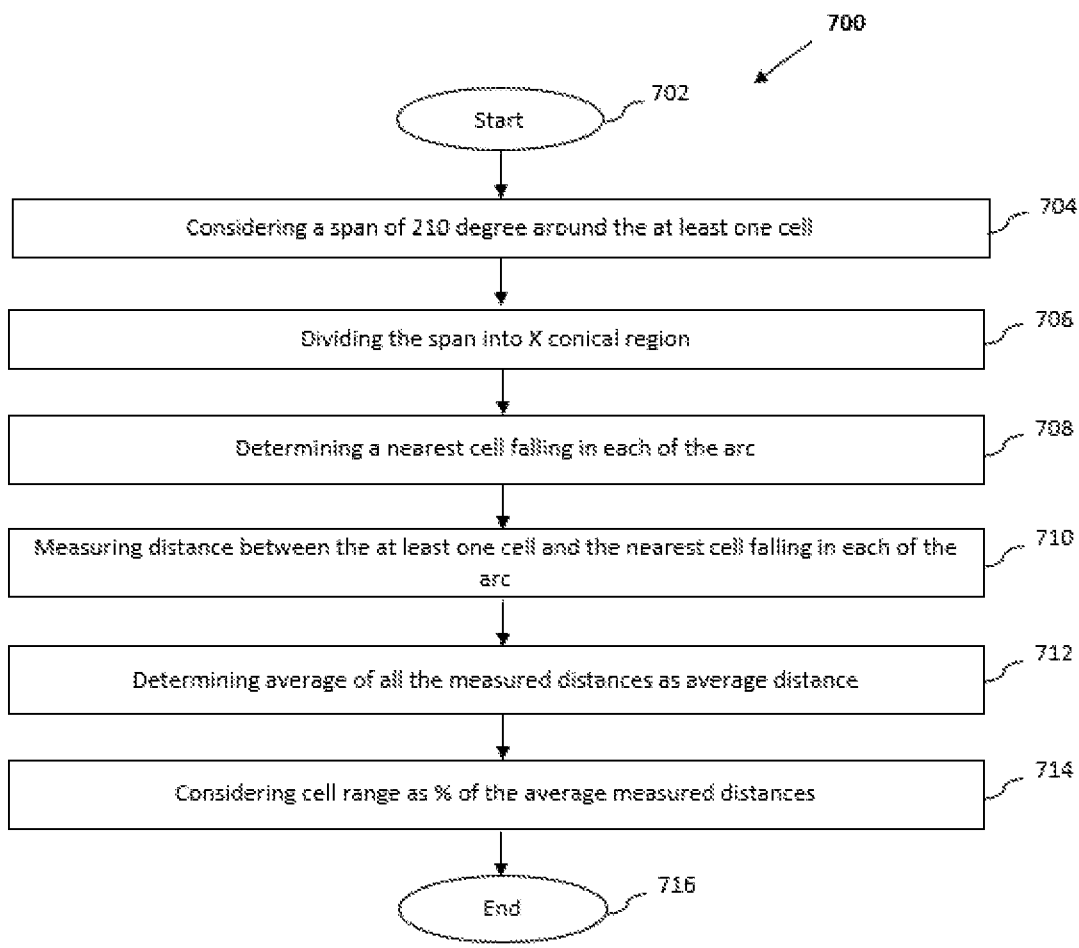
FIG. 7 illustrates an exemplary method flow diagram [700] for automatic identification and optimization of the at least one overshooting cell, in accordance with an embodiment of the present invention relating to a cell range based overshooting calculation.

As illustrated in FIG. 7, the present invention illustrates an exemplary method flow diagram [700] for automatic identification and optimization of the at least one overshooting cell [102], in accordance with an embodiment of the present invention relating to a cell range based overshooting calculation.

For the automatic cell range based overshooting identification, the input unit [304] may be configured to receive parameters for the timing advance distribution of the at least one cell [102], the morphology type of the at least one cell [102], the permissive void count threshold, the permissive range of operative user equipment, the non-operative user equipment in the passive timing advance and the cell site database with latitude/longitude and azimuth. The input unit [304] transmits the parameters to the optimizer unit [306] and the method flow diagram [700] initiates at step 702.

At step 704, the method flow diagram [700] may consider a span of 210 degree around the at least one cell [102] having the at least one cell [102] azimuth as center azimuth, i.e. consider a span of +105 degrees and −105 degrees on both sides of azimuth of the at least one cell [102].

At step 706, the method flow diagram [700] may divide the span into X conical region, each covering an area within (210/X) degree of arc.

At step 708, the method flow diagram [700] may determine a nearest cell falling in each of the arc.

At step 710, the method flow diagram [700] may measure distance between the at least one cell [102] and the nearest cell falling in each of the arc.

At step 712, the method flow diagram [700] may determine average of all the measured distances as average distance=(Sum of distance of all nearest cells)/(Number of nearest cells falling in each of the arc)

At step 714, the method flow diagram [700] may consider cell range as 70% of the average measured distances and may consider the calculated cell range to identify the at least one overshooting cell [102]. The method flow diagram [700] may end at step [716].

Figure 8:
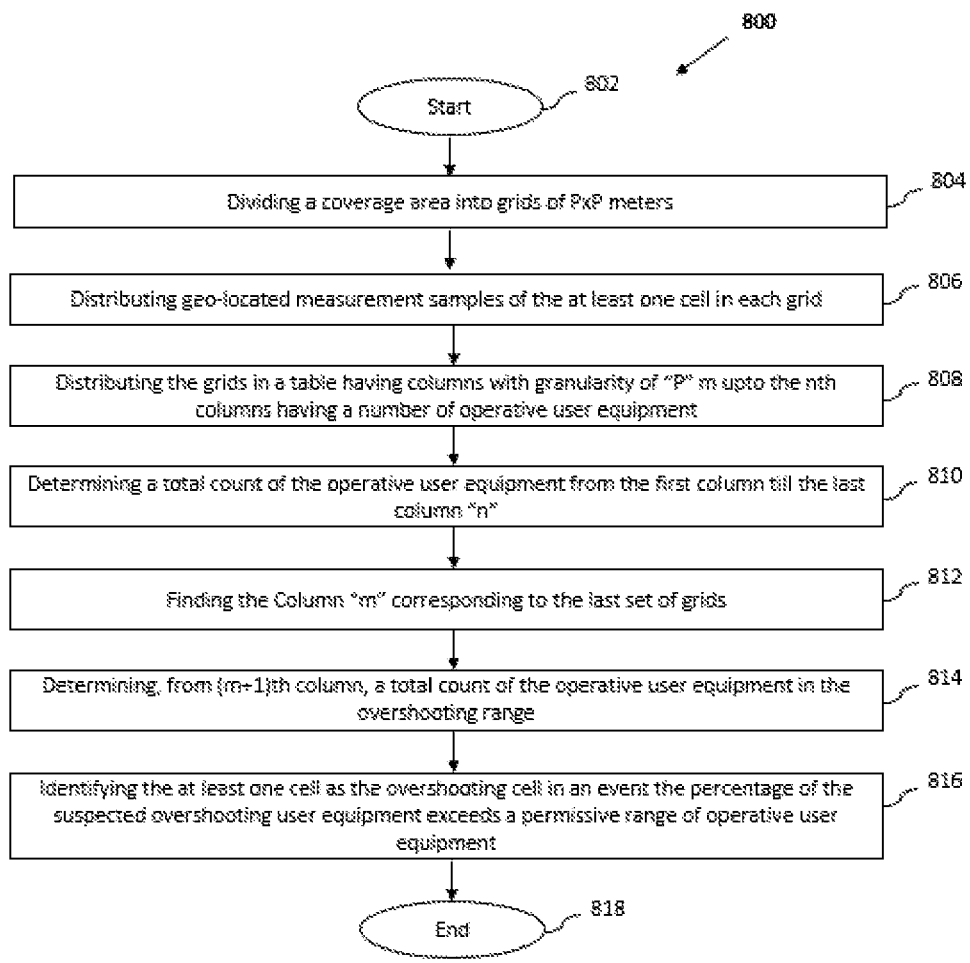
FIG. 8 illustrates an exemplary method flow diagram [800] for automatic identification and optimization of the at least one overshooting cell, in accordance with an embodiment of the present invention relating to a geo-located measurement events based overshooting identification.

As illustrated in FIG. 8, the present invention illustrates an exemplary method flow diagram [800] for automatic identification and optimization of the at least one overshooting cell [102], in accordance with an embodiment of the present invention relating to a geo-located measurement events based overshooting identification.

For the geo-located measurement events based overshooting identification, the input unit [304] may be configured to receive parameters for the timing advance distribution of the at least one cell [102], the morphology type of the at least one cell [102], the permissive void count threshold, the permissive range of operative user equipment, the geo-located measurement event logs from eNodeB or the at least one cell [102], the trace records, the extensive drive test log files and the network-wide cell database. The input unit [304] transmits the parameters to the optimizer unit [306] and the method flow diagram [800] initiates at step 802.

At step 804, the method flow diagram [800] may divide the coverage area [104, 106] into grids of P×P meters, with each grid having reference signals received power (referred hereinafter as RSRP) and signal-to-interference-plus-noise ratio (referred hereinafter as SINR) samples obtained from the measurement events data and/or the drive test data.

At step 806, the method flow diagram [800] may distribute the geo-located measurement samples of the at least one cell [102] into each grid.

At step 808, the method flow diagram [800] may distribute the grids into a table having columns with granularity of "P" metres upto the nth columns having the number of operative user equipment from the at least one cell [102] under consideration.

At step 810, the method flow diagram [800] may determine the total count of the operative user equipment from the first column (i.e. at "P" meters from at least one cell [102]), till the last column "n" where the operative user equipment appears.

At step 812, the method flow diagram [800] may find the Column "m" corresponding to the last set of grids that meets the morphology based coverage range derived from a planning tool.

At step 814, the method flow diagram [800] may determine, from (m+1)th column, the total count of the operative user equipment in the overshooting range [106] based on the morphology of the area covered by the at least one cell [102]. Such operative user equipment in the overshooting range [106] may be termed as suspected overshooting user equipment.

At step 816, the method flow diagram [800] may identify the at least one cell [102] as the overshooting cell [102] in an event the percentage of the suspected overshooting user equipment, out of the total operative user equipment, exceeds the permissive range of operative user equipment. The method flow diagram [800] may end at step [818].

Figure 9:
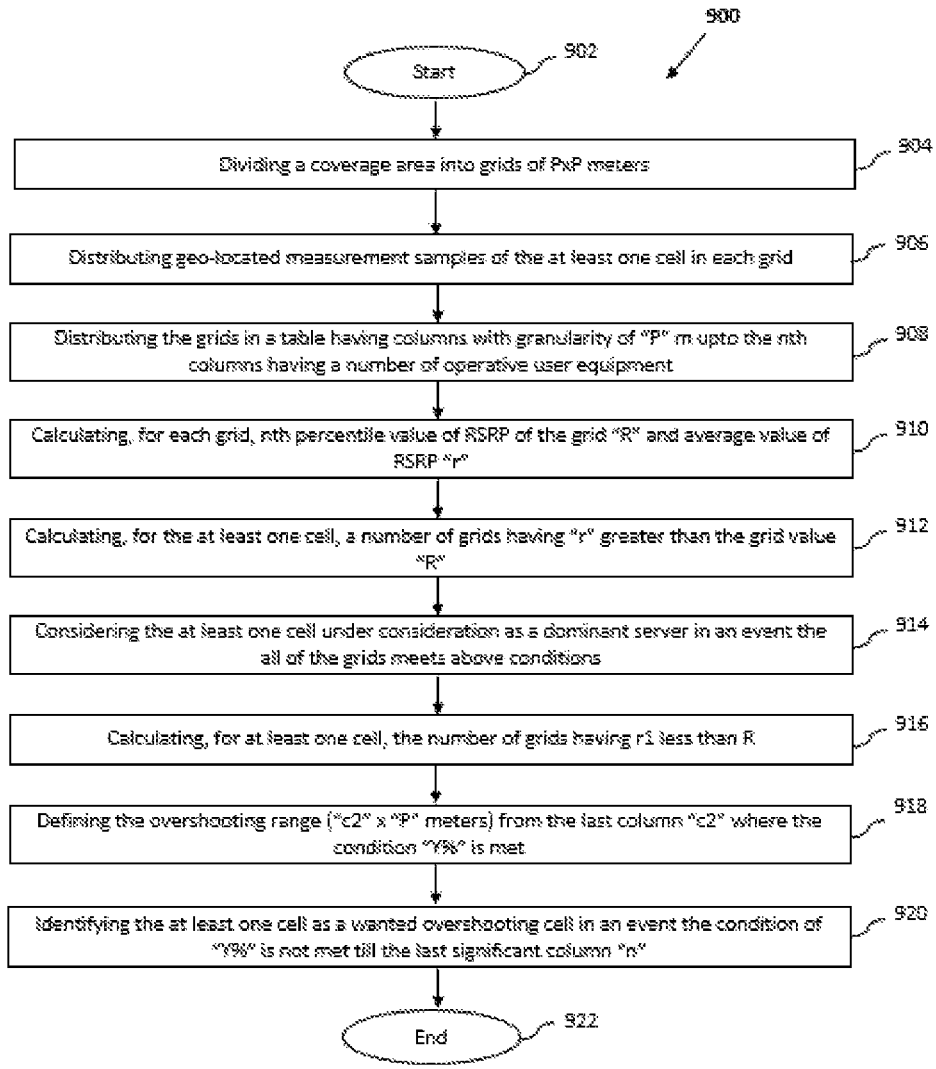
FIG. 9 illustrates an exemplary method flow diagram [900] for automatic identification and optimization of the at least one overshooting cell, in accordance with an embodiment of the present invention relating to a different geo-located measurement events based overshooting identification.

As illustrated in FIG. 9, the present invention illustrates an exemplary method flow diagram [900] for automatic identification and optimization of the at least one overshooting cell [102], in accordance with an embodiment of the present invention relating to a different geo-located measurement events based overshooting identification. The method flow diagram [900] initiates at step 902.

Figure 10:
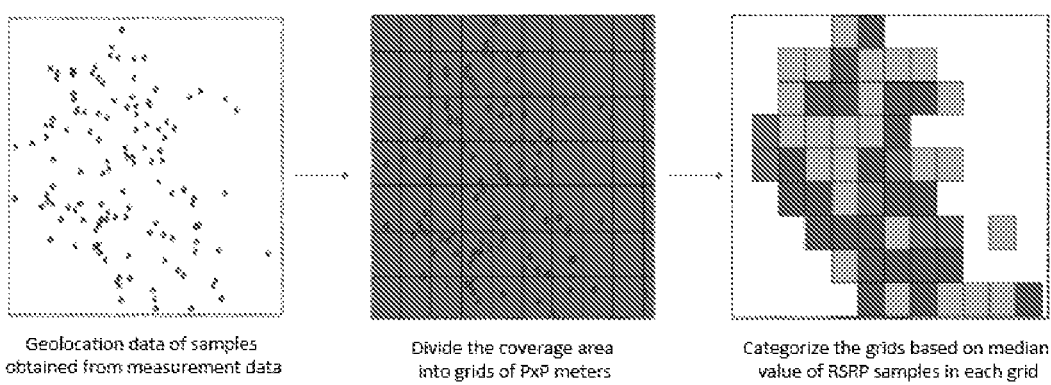
FIG. 10 illustrates an exemplary geolocation measurement data of the at least one overshooting cell, in accordance with an embodiment of the present invention relating to geo-located measurement events based overshooting identification.

At step 904, the method flow diagram [900] may divide the coverage area [104, 106] into grids of P×P meters, with each grid having RSRP/SINR/channel quality indicator (CQI)/modulation and coding schemes (MCS) samples obtained from the measurement events data and/or the drive test data as depicted in FIG. 10.

At step 906, the method flow diagram [900] may distribute the geo-located measurement samples of the at least one cell [102] into each grid as depicted in FIG. 10.

At step 908, the method flow diagram [900] may distribute the grids into a table having columns with granularity of "P" metres upto the nth columns having the number of operative user equipment from the at least one cell [102] under consideration.

At step 910, the method flow diagram [900] may calculate, for each grid, the nth percentile value of RSRP of the grid "R" and average value of RSRP "r" appearing in that grid.

At step 912, the method flow diagram [900] may calculate, for the at least one cell [102], a number of grids having "r" greater than the grid value "R" by an offset "h" dBm configurable by operator. Starting from distance equal to cell coverage range [104, 106] derived from the planning tool, such calculation may be made in granularity of "P" metres from the at least one cell [102] until "X %" of the grids (configurable) have RSRP greater than grid RSRP "R" by an offset of "h" dBm is not met.

At step 914, the method flow diagram [900] may consider the at least one cell [102] under consideration as a dominant server in an event the all of the grids meet above conditions.

At step 916, the method flow diagram [900] may calculate, for at least one cell [102], the number of grids having r1 less than R. Starting from distance equal to good coverage limit, such calculation may be made until at least configurable "Y %" of the grids have RSRP r less than R is met and "Z %" of the total of the operative user equipment may have been considered. Any grid meeting above conditions may not under consideration as the dominant server.

At step 918, the method flow diagram [900] may define the overshooting range [106] ("c2"×"P" meters) from the last column "c2" where the condition "Y %" is met as explained in step 912. The last column having significant number of operative user equipment from the at least one cell [102] under consideration may be marked as "c3".

At step 920, the method flow diagram [900] may identify the at least one cell [102] as the wanted/good overshooting cell [102] in an event the condition of "Y %" is not met till the last significant column "n", wherein the wanted/good overshooting cell [102] may overshoot beyond the pre-defined coverage range [104] but may not be restricted due to absence of any other dominant servers in the coverage range [104, 106] being covered by the wanted/good overshooting cells [102]. Any other suspected overshooter cells that meet the conditions specified above, may be classified the unwanted/bad overshooter cells. The method flow diagram [900] may end at step [922].

As used herein, the RSRP may be a measurement of a power level in the radio signals transmitted by the at least one cell.

As used herein, the RSRQ may be a measurement of the quality of the radio signal t transmitted by the at least one cell and may be used for selection and/or re-selection of the at least one cell, Further, the RSRQ may be used for performing hand-overs of user equipment/s and estimating the path loss for power control calculations.

As used herein, the SINR may refer to a quantity of a channel capacity for the at least one cell.

As used herein, the CQI may indicate a quality/condition of a wireless channel for transmitting signal/information i.e. for an instance, the condition of the wireless channel may be good for the transmitting signal/information or the condition of the wireless channel may be bad for transmitting the signal/information.

As used herein, the MCS may refer to may be used for determining data rate for transmitting signal/information in the wireless channel and may also indicate which type of modulation scheme used for transmitting the signal/information.

The unit, interface, module, and component depicted in the figures and described herein may be present in the form of a hardware, a software and a combination thereof. Connection shown between these units/components/module/interface in the exemplary scenarios [100A, 100B] and system [300] are exemplary and any units/components/module/interface in the system [300] may interact with each other through various logical links and/or physical links. Further, the units/components/module/interface may be connected in other possible ways.

Though a limited number of the at least one cell/overshooting cell [102], the first set of user equipment [104A-104G] in the pre-defined coverage range [104], the second set of user equipment [106A-106F] in the overshooting range [106], the timing advances in the pre-defined coverage range [104], the timing advances in the overshooting range [106], units, interfaces, modules and components, have been shown in the figures; however, it will be appreciated by those skilled in the art that the exemplary scenarios [100A, 100B] and system [300] of the present invention encompasses any number and varied types of the entities/elements such the at least one cell/overshooting cell [102], the first set of user equipment [104A-104G] in the pre-defined coverage range [104], the second set of user equipment [106A-106F] in the overshooting range [106], the timing advances in the pre-defined coverage range [104], the timing advances in the overshooting range [106], the units, interfaces, modules and components.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for automatic identification and optimization of at least one overshooting cell, the method comprising:
   receiving at least one parameter associated with at least one cell, wherein
      the at least one parameter comprises a permissive void count threshold and at least one transmission parameter corresponding to a coverage area of the at least one cell,
      the at least one cell comprises at least one timing advance (TA), and
      the at least one TA timing advance has a permissive range of operative user equipment;
   identifying the at least one TA as one of an active TA and a passive TA, wherein
      the active TA corresponds to the at least one TA with at least one operative (UE), and
      the passive TA corresponds to the at least one TA without at least one operative UE;
   determining at least one of a UE count of the operative UE in the active TA and a void count of the passive TA in the at least one cell;
   identifying the at least one cell as the at least one overshooting cell, wherein the at least one overshooting cell is identified based on a comparison of at least one of:

the UE count of the operative UE in the active TA with the permissive range of operative UE, and the void count of the passive TA with the permissive void count threshold; and modifying the at least one transmission parameter to change the coverage area of the at least one overshooting cell.

2. The method as claimed in claim 1, further comprising identifying one of a good overshooter and a bad overshooter from the at least one overshooting cell.

3. The method as claimed in claim 1, wherein the at least one cell is identified as the at least one overshooting cell in an event, at least one of:

the UE count of the operative UE in the active TA exceeds the permissive range of operative UE; and the void count of the passive TA exceeds the permissive void count threshold.

4. The method as claimed in claim 1, wherein the at least one parameter comprising at least one of a neighbour ranking data, a handover data, an interference information, a geolocated measurement event logs, a morphology type, a site database with a latitude/longitude and an azimuth, a call trace record, an extensive drive test log file, a network-wide cell database, a signal received quality, and a channel quality indication.

5. The method as claimed in claim 1, wherein the at least one transmission parameter includes at least one of a transmission power value, a reference signal power value and a tilt angle value corresponding to the coverage area of the at least one overshooting cell.

6. The method as claimed in claim 1, wherein the permissive void count threshold corresponds to a predefined count of the passive TA acceptable to occur in a sequence.

7. The method as claimed in claim 1, wherein the permissive range of operative UE user equipment corresponds to a predefined count of UE allowed to operate in the at least one TA.

8. A system for automatic identification and correction/remediation of at least one overshooting cell, the system comprising:

an input unit configured to:
  receive at least one parameter associated with at least one cell, wherein
    the at least one parameter comprises a permissive void count threshold and at least one transmission parameter corresponding to a coverage area of the at least one cell,
    the at least one cell comprises at least one timing advance (TA), and
    the at least one TA has a permissive range of operative user equipment; and an optimizer unit configured to:
  identify the at least one TA as one of an active TA and a passive TA, wherein
    the active TA corresponds to the at least one TA with at least one operative user equipment (UE), and
    the passive TA corresponds to the at least one TA without at least one operative UE,
  determine at least one of a UE count of the operative UE in the active TA and a void count of the passive TA in the at least one cell,
  identify the at least one cell as the at least one overshooting cell, wherein the at least one overshooting cell is identified based on comparison of at least one of:
    the UE count of the operative UE in the active TA with the permissive range of operative UE, and
    the void count of the passive TA with the permissive void count threshold; and
  modify the at least one transmission parameter to change the coverage area of the at least one overshooting cell.

9. The system as claimed in claim 8, wherein the at least one transmission parameter includes transmission power value, a reference signal power value and a tilt angle value corresponding to the coverage area of the at least one overshooting cell.

* * * * *